United States Patent [19]

Kolodzey et al.

[11] Patent Number: 4,459,261
[45] Date of Patent: Jul. 10, 1984

[54] SUPPORT STRUCTURE FOR A CORE OF A HIGH TEMPERATURE REACTOR

[75] Inventors: Juergen Kolodzey, Ketsch; Josef Schoening, Hambruecken; Hans-Georg Schwiers, Ketsch; Wilfried Stracke, Oftersheim, all of Fed. Rep. of Germany

[73] Assignee: Hochtemperatur-Reaktorbau GmbH., Cologne, Fed. Rep. of Germany

[21] Appl. No.: 285,018

[22] Filed: Jul. 20, 1981

[30] Foreign Application Priority Data

Jul. 19, 1980 [DE] Fed. Rep. of Germany ....... 3027513

[51] Int. Cl.³ .................. G21C 11/00; G21C 9/00
[52] U.S. Cl. ................... 376/285; 267/177; 376/381
[58] Field of Search .............. 376/285–287, 376/381, 382, 458, 302–304; 267/177, 170, 175, 174, 179, 167, 70, 166; 188/321.11, 322.11, 60; 403/2, 109, 166; 285/1, 2; 464/32, 169

[56] References Cited

U.S. PATENT DOCUMENTS

| | | | |
|---|---|---|---|
| 1,252,397 | 1/1918 | Carter | 267/177 |
| 1,944,185 | 1/1934 | Langer | 267/177 |
| 2,373,125 | 4/1945 | Loepsinger | 267/70 |
| 2,468,939 | 5/1949 | Mercier | 188/321.11 |
| 2,621,005 | 12/1952 | Turpin | 267/177 |
| 2,647,412 | 8/1953 | Warmoes et al. | 267/174 |
| 2,712,932 | 7/1955 | Gould | 267/70 |
| 2,732,747 | 1/1956 | Livermont | 267/175 |
| 3,120,951 | 2/1964 | Finch | 267/70 |
| 3,345,711 | 10/1967 | McCarthy | 403/166 |
| 3,585,817 | 4/1971 | McCafferty, Jr. et al. | 267/177 |
| 3,781,039 | 12/1973 | Lock et al. | 285/1 |
| 4,103,881 | 8/1978 | Simich | 267/177 |
| 4,152,602 | 5/1979 | Kaminski et al. | 376/302 |
| 4,191,280 | 3/1980 | Copperwheat | 188/322.11 |
| 4,233,518 | 11/1980 | Auyeung et al. | 376/272 |
| 4,259,156 | 3/1981 | Neuenfeldt et al. | 376/285 |
| 4,268,018 | 5/1981 | Langanke | 188/321.11 |
| 4,314,883 | 2/1982 | Fritz et al. | 376/381 |
| 4,330,926 | 5/1982 | McCall | 403/2 |

FOREIGN PATENT DOCUMENTS

| | | | |
|---|---|---|---|
| 1261606 | 2/1968 | Fed. Rep. of Germany | 376/285 |
| 2940469 | 4/1980 | Fed. Rep. of Germany | 376/272 |

Primary Examiner—Harvey E. Behrend
Attorney, Agent, or Firm—Schwartz, Jeffery, Schwaab, Mack, Blumenthal & Koch

[57] ABSTRACT

A support structure for the core of a gas cooled high temperature reactor utilizes a plurality of compression members arranged in an annular space between a plurality of graphite blocks forming the roof, bottom and cylindrical side walls of a reflector surrounding the reactor core and a thermal shield surrounding the reflector. Each compression member comprises a compression body, a first bolt part having the configuration of a threaded rod, a threaded area on the inner surface of the compression body for receiving the threaded bolt part, a second bolt part having the configuration of a piston, a sliding area on the inner surface of the compression body for receiving the piston bolt part, and means for producing a compressive force between the piston bolt part and the compression body. The plurality of compression members are attached to the reflector and thermal shield by way of a plurality of ball-and-socket joints.

10 Claims, 2 Drawing Figures

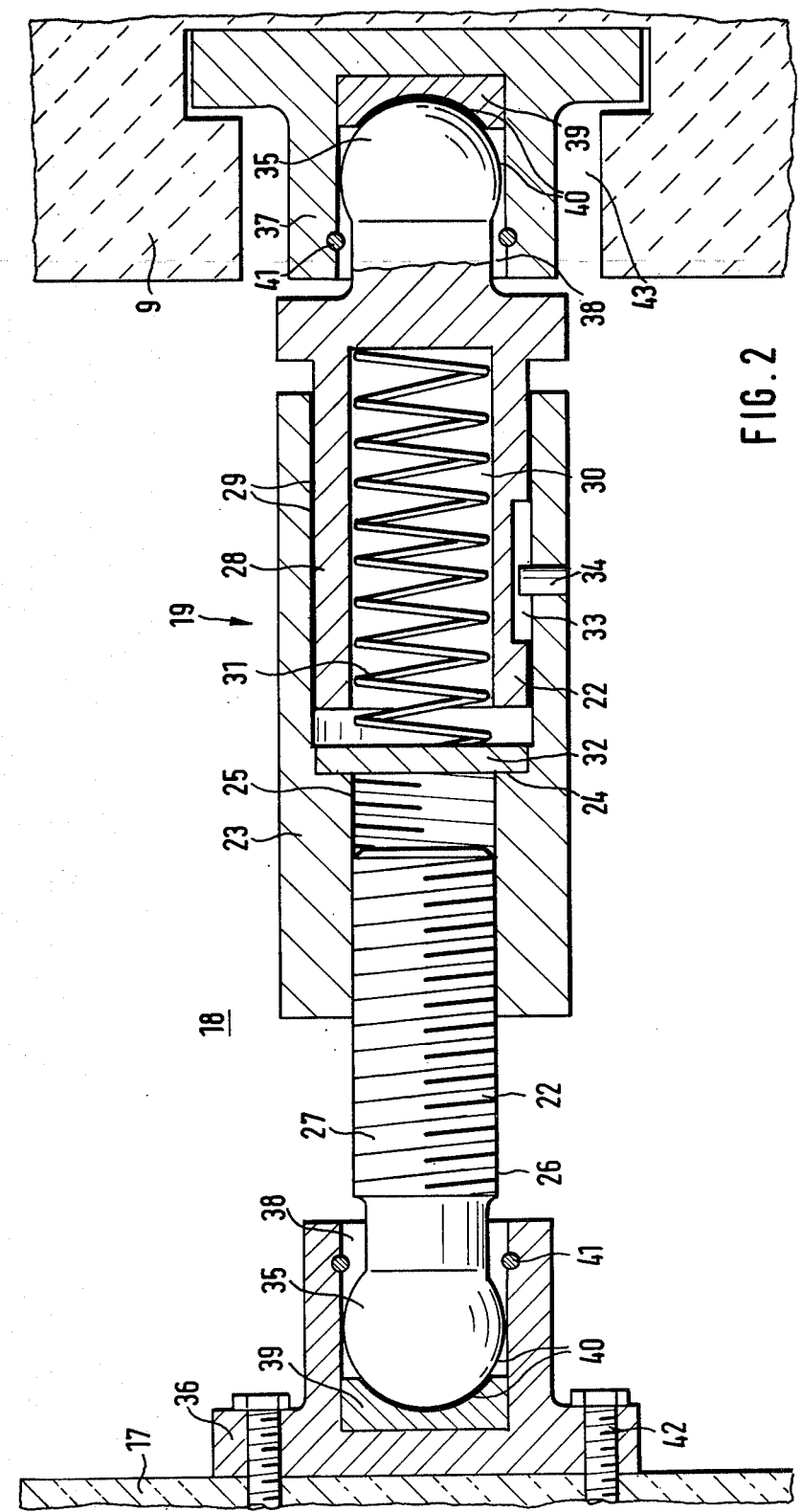

SUPPORT STRUCTURE FOR A CORE OF A HIGH TEMPERATURE REACTOR

BACKGROUND OF THE INVENTION

1. Field of the Invention

The invention concerns a support structure for the core of a gas cooled high temperature reactor. Such reactors typically consist of a pile or bed of spherical fuel elements, wherein absorber rods may be inserted directly and which are surrounded on all sides by a reflector. The reflector has a roof, a bottom and a cylindrical side reflector consisting of a plurality of graphite blocks. The cylindrical side reflector is enclosed at a distance with a lateral thermal shield. The support structure employs a plurality of compression members arranged in the annular space between the side reflector and the lateral thermal shield.

The side reflector of a so-called pebble bed reactor must be capable of absorbing both the stationary forces of the pebble bed and the non-stationary forces generated by the flow of gas and the insertion of the absorber rods in the pebble bed. High temperature resistant moderator material, such as graphite, must be used in the side reflector, but the properties of this material do not permit exposure to high tensile and bending stresses. The forces of the reactor core must, therefore, be transmitted radially in the outward direction. From there, they are conducted into the reactor pressure vessel. The lateral thermal shield simultaneously serves as the nuclear shield for structural parts located on the outside.

In the transfer of the horizontal forces of the reactor core to the lateral thermal shield, it must be assured that the differential thermal expansions of the side reflector and the lateral thermal shield are not hindered, so that the mutual stressing and the associated thermal stresses of the side reflector and the lateral thermal shield may be avoided. The supporting of the side reflector against the lateral thermal shield must, therefore, be effected by means of elastic supporting elements. These elements are preferably arranged in the annular space between the side reflector and the lateral thermal shield. At the same time, inadmissible displacement of the side reflector must be prevented.

2. Background of the Prior Art

The state-of-the-art is illustrated by a side reflector known from West German Pat. No. 1 261 606. The reflector consists of graphite blocks of a circular cross section, surrounding a cylindrical cavity. A cylindrical thermal shield in turn surrounds the reflector. The side reflector is supported over its entire height by means of elastic compression elements acting in the radial direction against the lateral thermal shield. Each pressure element comprises a threaded nut welded into the lateral thermal shield with a bushing screwed into it. The bushing serves as the bearing surface for a column of flat springs. The compressive force of the flat springs acts on a prop guided within the bushing and is transmitted by said prop by means of two support elements to the side reflector. Even though the known supporting installation is adequate for the satisfactory transfer of radial compressive forces, it is capable of absorbing the axial relative movements of the thermal shield and the side reflector to a limited degree only (i.e. movements transverse to the support structure).

SUMMARY OF THE INVENTION

It is, therefore, an object of the present invention to provide a support structure for the above-described arrangement capable of adequately equalizing both radial and axial relative movements between the thermal shield and the side reflector. Furthermore, the support structure is readily manufactured and simple to install.

This and other objects are attained according to the invention by a support structure including a two-part bolt and a compression member which advantageously includes a hollow, cylindrical compression body enclosing both parts of the bolt. One part of the bolt is in the shape of a threaded rod and screwed into a threading of the compression body. The other part of the bolt represents a guide piston sliding in the compression body. The guide piston has a cylindrical recess wherein a biasing means such as a spring is arranged in order to effect a constant compressive force between the guide piston and the compression body. The ends of the two parts of the bolt facing away from each other are respectively supported by a ball-and-socket joint each against the lateral thermal shield and the side reflector.

The ball-and-socket joints effect the equalization of the differential thermal expansions of the lateral thermal shield and the side reflector, which are the result of the different coefficients of thermal expansion and temperatures of the two structural parts. In the process, relative movements occurring both in the axial and the radial directions are compensated. The pressure of the spring on the guide piston and the compression body assures a steady contact between the lateral shield and the side reflector.

The invention further renders possible an economical construction of the lateral thermal shield and the side reflector, as manufacturing tolerances may be equalized by means of the threaded connection between one of the parts of the bolt and the compression body. The adjustment of pressure clearance inherent in the system is also possible by means of the threaded connection.

The support structure according to the invention is preferably prefabricated for a given application and completely assembled. This favorably affects both the time and cost of the installation.

Advantageously, a pair of ball-and-socket joints are formed by a ball located on the respective end of the bolt and a unit mounted respectively on the lateral thermal shield and the side reflector. The unit possesses a cylindrical recess facing an annular space, and a ball-socket arranged on the bottom of the cylindrical recess. All of the parts of the ball-and-socket joint and the two-part bolt and the compression body are made preferably by turning and are, therefore, easily produced.

In order to prevent the frictional seizing of structural parts sliding upon each other, when used in a helium atmosphere of the high temperature gas cooled reactors, these parts (balls, ball-sockets, the corresponding surfaces of the guide piston and the compression body) are provided with a special protective coating. Such coating is any of the commercially available compositions which remain effective in helium atmosphere and at high temperatures.

In a preferred embodiment, it is advantageous to limit the pressure clearance of the spring between the guide piston and the compression body. For this purpose a longitudinal groove is machined in the jacket of the guide piston. The groove cooperates with a pin. The pin is arranged radially in the compression body in a manner so that it engages the longitudinal groove. By suitably dimensioning the pin, it may be made to act as a shear pin, i.e., it forms a preset breaking point. It thereby protects the side reflector from destruction if excessive tensile forces are generated by a malfunction.

The compressive force of the spring may be transmitted by means of a pressure plate to the compression body, the pressure plate is located inside the compression body and abuts against an annular shoulder. The shoulder preferably forms the end of the area of the compression body provided with internal threading.

Conveniently, a structural element narrowing the cross section is installed in each of the cylindrical recesses of the two flanges, preventing the exit of the ball from the socket unit. This structural element may, for example, consist of a ring set into a groove of the recess, or it may be formed by a plurality of balls.

BRIEF DESCRIPTION OF THE DRAWINGS

In the drawings, embodiments of the support structure according to the invention are represented schematically. In the drawing:

FIG. 2 illustrates a longitudinal section through one member of the support structure.

DESCRIPTION OF PREFERRED EMBODIMENTS

Figure 1:
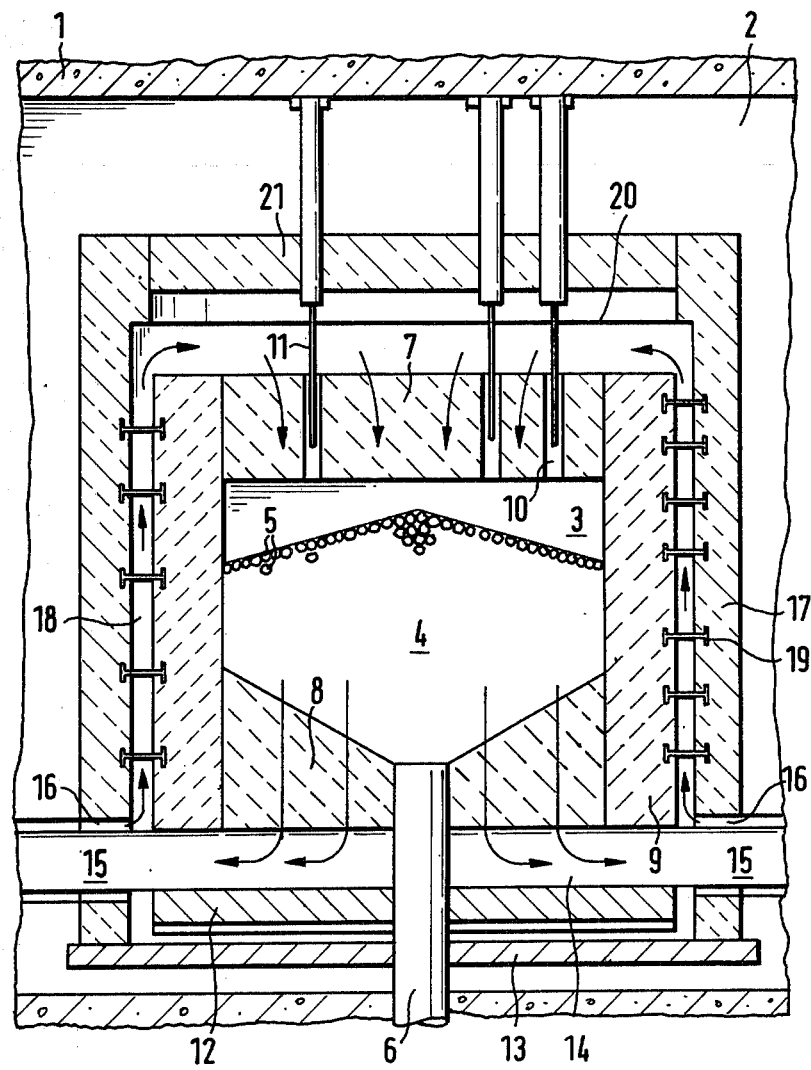
FIG. 1 shows a longitudinal section through a high temperature reactor with a support structure according to the invention.

FIG. 1 shows a reactor pressure vessel 1, for example, of reinforced concrete, with a cylindrical cavity 2. A high temperature reactor generally indicated at 3 is installed in the cylindrical cavity 2. The core of the high temperature reactor 3 is formed by a bed 4 of spherical fuel elements 5 which are removed from the bed 4 by means of a fuel removal tube 6. The structure for charging the fuel elements 5 is not shown. A cooling gas, helium in this case, is flowing from top to bottom through the bed 4.

The bed 4 is surrounded on all sides by a reflector assembled of graphite blocks, consisting of a roof reflector 7, a bottom reflector 8 serving as a support floor and a cylindrical side reflector 9. In the roof reflector 7, passages 10 for absorber rods 11 are provided, which may be inserted directly in the bed 4. The bottom reflector 8 rests on the bottom layers 12 of the high temperature reactor 3 which are joined in the downward direction by a bottom plate 13.

Between the bottom reflector 8 and the bottom layers 12, there is a hot gas collector compartment 14, to which several hot gas lines 15 are radially connected. The latter are communicating with a plurality of steam generators (not shown). From the steam generators, the helium, compressed in blowers, is returned to the high temperature reactor 3 through lines 16 installed coaxially with respect to the hot gas lines 15.

The side reflector 9 is enclosed in a cylindrical lateral thermal shield 17, with an annular space 18 being provided between the two structural parts. In the annular space 18, a plurality of support installations 19 is arranged whereby the side reflector 9 is supported elastically against the lateral thermal shield 17. The horizontal forces of the reactor core resulting from the bed 4, the flow of gas and the insertion of the absorber rods 11 in the bed 4, are thereby transmitted to the thermal side shield 17. This is accomplished without the possible occurrence of the mutual stressing of the side reflector and the lateral shield arising from differential thermal expansions.

As illustrated in FIG. 1, the annular space 18 is in communication with a cold gas collector compartment 20 which is defined in the downward direction by the roof reflector 7 and upwardly by a thermal roof shield 21. In order to cool the lateral thermal shield 17, the cold and compressed helium flowing from the lines 16, is conducted through the annular space 18 and enters the cold gas collector compartment on top.

FIG. 2 shows one of the two part bolt structures, mounting means and compression members 19 arranged in the annular space 18. The structure comprises a two-part bolt 22 and a hollow, cylindrical compression body 23, surrounding the bolt 22 over a major part of its length. The cavity in the compression body 23 has two areas of different diameters, whereby an annular shoulder 24 is formed. In one of the areas an internal threading 25 is provided. One part of the two-part bolt 22 is screwed into the threading; the part being equipped with the corresponding outer threading, thereby representing a threaded rod 27.

The other part of the two-part bolt 22 is in the form of a guide piston 28, sliding in the cavity of the compression body 23, having the larger diameter. The surfaces sliding upon each other of the guide piston 28 and the compression body 23 are provided with a special coating 29 against frictional seizing in the helium atmosphere.

The guide piston 28 has a cylindrical recess 30 wherein a spring 31 is arranged. The latter rests with one end against a pressure plate 32 which abuts against the annular shoulder 24 inside the compression body 23. The spring 31 produces a constant compression force between the guide piston 28 and the compression body 23. In order to limit the pressure clearance fo the spring 31, a longitudinal groove 33 is provided in the jacket of the guide piston 28. A pin 34 engages the groove. The pin is fixedly attached to a radial bore of the compression body 23. The pin 34 in the compression body 23 also serves as a shear pin, i.e., it forms a set breaking point in order to protect the side reflector 9 against any excessive tensile forces that are generated.

The two-part bolt 22 is supported by means of ball-and-socket joints on one side against the lateral thermal shield 17 and on the other side against the side reflector 9. The ball-and-socket joints make possible the equalization of both axial and radial movements between the two structural parts 17 and 9, while constant contact of the lateral thermal shield and the side reflector is maintained by means of the two-part bolt. Additionally, tolerances may be compensated by means of the threaded connection between the threaded rod 27 and the compression body 23. In the alternative, a certain pressure clearance may be set by rotating the threaded rod 27.

The ball-and-socket joints consist individually of a ball 35 machined onto the respective ends of the bolt, a flange 36 and 37, respectively, with a cylindrical recess 38 open toward the annular space 18, and a ball socket 30 arranged on the bottom of said recess. The balls 35 slide in the ball sockets 39. They are provided, together with the ball sockets, with a coating 40 against frictional seizing in the helium atmosphere. In each of the recesses 38, an annular structural element 41 is arranged on top in a groove, narrowing the cross section of the recess 38, thereby preventing the slipping out of one of the balls 35.

The flange 36 of one of the ball-and-socket joints is mounted on the lateral thermal shield 17, fastened thereto by the screws 42. The flange 37 of the second ball-and-socket joint, on the other hand, mounted on the side reflector, is set into one of the graphite blocks of the side reflector, equipped for this purpose with a T-shaped groove 43.

The specification and drawings set forth the preferred embodiments of the invention. It should be noted, however, that the invention is not limited to those specific embodiments and methods specifically disclosed, but extends to all embodiments, substitute and equivalent constructions falling within the scope of the invention as defined by the claims.

What is claimed is:

1. A gas cooled high temperature reactor having a pebble-bed core comprising:
    a plurality of graphite blocks forming the roof, bottom and cylindrical side walls of a reflector surrounding the pebble-bed reactor core;
    a thermal shield surrounding said reflector and forming an annular space between said cylindrical side wall and said thermal shield;
    a plurality of supporting struts, arranged in said annular space and supporting said cylindrical side wall against said thermal shield, each supporting strut comprising a hollow cylindrical compression body, a first bolt having the configuration of a theaded rod, a theaded area on the inner surface of said compression body for receiving said threaded bolt part, a second bolt part having the configuration of a piston, a sliding area on the inner surface of said compression body for receiving said piston bolt part, a spring for producing a compressive force between said piston bolt part and said compression body, arranged in a cylindrical recess in said piston bolt part, a pressure plate arranged within said hollow compression body resting against a shoulder in said body and supporting said spring on the side opposite said shoulder;
    a plurality of ball-and-socket joints for attaching said plurality of supporting struts to said cylindrical side wall and said thermal shield, each ball-and-socket joint comprising a ball shape at one end of each of said first and second bolt parts, said bolt parts extending from opposite ends of said compression body, and a corresponding socket unit for receiving each of said ball shapes, a plurality of said socket units being mounted to said cylindrical side wall and a plurality of said socket units being mounted to said thermal shield.

2. The support structure of claim 1 wherein each of said socket units comprise a flange member and an integrated ball receiving member wherein said flange member is mounted to said cylindrical side wall or said thermal shield and said ball receiving member at least partially surrounds said ball shaped end of said first bolt part or said second bolt part.

3. The support structure of claim 2 wherein said flange members mounted to said thermal shield are mounted with screws and said flange members mounted to said cylindrical side wall are mounted in T-shaped grooves in said cylindrical side wall.

4. The support structure of claim 3 further comprising a friction protective coating on said ball shaped ends and said socket units.

5. The support structure of claim 4 further comprising a friction-protective coating on said sliding area on the inner surface of said compression body and on said piston bolt part.

6. The support structure of claim 5 further comprising a longitudinally extending groove in the outer surface of said piston bolt part and a pin fixedly attached to said compression body wherein said pin engages said longitudinally extending groove.

7. The support structure of claim 6 wherein said pin comprises a shear pin designed to break upon movement of said longitudinal groove past a predetermined point.

8. The support structure of claim 7 wherein said cylindrical recess in said compression body comprises a pressure plate resting against a shoulder in said compression body and support said spring on the side opposite said shoulder.

9. The support structure of claim 8 further comprising means to prevent the release of said ball shaped ends from said socket units.

10. The support structure of claim 9 wherein said ball release prevention means comprises an annular shaped member mounted in the opened end of said ball receiving member.

* * * * *